Patented June 11, 1935

2,004,257

UNITED STATES PATENT OFFICE 2,004,257

PURIFICATION OF WATER BY ZEOLITES

Frederick Tschirner, Medford, N. J., assignor to Zeolite Chemical Company, New York, N. Y., a corporation of New Jersey No Drawing. Application April 7, 1931, Serial No. 528,463

11 Claims. (Cl. 210—24)

This invention relates to the purification of water by zeolites and in general has for an object the provision of improvements in this art.

Water in many localities contains various impurities which need to be removed in order that the water may be rendered suitable for household or industrial purposes. Aeration to form oxides of the oxidizable impurities which will then precipitate from the water, sand filtration to remove suspended matter including the oxides precipitated by aeration, and the lime soda process for removing temporary or permanent hardness are methods which have been widely practiced for removing these impurities.

In recent years the base exchange method of removing hardness from water by the employment of beds of a zeolite has come into extensive use. The base exchange action depends upon the electrolytic dissociation in water of the compounds which cause hardness, for example, the sulphates of lime (Ca), magnesium (Mg), aluminum (Al), manganese (Mn) or iron (Fe), and the replacement of the base ions of the zeolite by the ions of the dissociable hardness producing compounds. The zeolite becomes exhausted after a certain time and must be regenerated. This is done by washing the zeolite bed with a brine formed from an alkali salt, usually NaCl.

The removal of lime and magnesium compounds seldom affects the zeolite in such a way that its softening capacity cannot be completely restored by the regenerative treatment; but when the compounds of the other metals (Al, Mn and Fe) are present the regeneration is not complete and the softening capacity of the zeolite is gradually exhausted. There appears to be a deposit of metallic oxides within the pores of the zeolite grains and these deposits I have found are due to the presence of non-dissociable colloids. The dissociable compounds even of iron do not necessarily cause a deposit of oxides.

The formation of the deposit is very rapid with certain types of water, especially with water charged with iron compounds. Artificial zeolites which are highly porous are most rapidly affected but even natural zeolites whose base exchange capacity is almost completely a surface action in time are reduced in effectiveness.

For this reason it is desirable to remove the harmful compounds of iron, etc., before the water is passed through the softening zeolite to have its hardness removed. That is, successive treatments are required which necessitates additional apparatus and work.

The preliminary treatment has been accomplished by aeration, and filtration as noted above or by another process involving the use of a filter bed containing a manganese zeolite which is activated and regenerated by potassium permanganate ($KMnO_4$).

I have discovered that the compounds which cannot be removed by base exchange action appear to be in the form of colloids in which the acid radical of the colloid is so masked that it cannot complete a base exchange with the zeolite, that is, mass action in the water cannot begin. For example, it is known that one form of iron colloid is composed of ferric chloride and ferric hydroxide, the proportions of the two components ranging from 1 to 8 to 1 to 40. In this colloid the hydrochloric acid should form in water if the substance were dissociable but when using a colloid properly prepared by dialysis for a test there is no indication of the presence of this acid. The strongest tests do not indicate its presence. There is no precipitate of silver chloride (AgCl) when testing with silver nitrate ($AgNo_3$); nor is there the blue color characteristic of ferri-ferro-cyanide when testing with potassium-ferro-cyanide (where the potassium (K) ion is supposed to be replaced by the ferric ion).

Both the aeration and manganese zeolite processes involve the oxidation of the colloids to precipitate them as a sludge which can be removed by filtration and back washing.

I have discovered that the colloids may be removed by a coagulent. For example, I treated a softening zeolite with ferrous sulphate ($FeSo_4$) in order by straight base exchange to form a ferrous zeolite through replacement of the sodium ions by the ferrous ions. The ferrous zeolite will remove colloidal compounds from the water. This is apparently accomplished by an intermediate coagulating action, for there are no compounds present which could produce an oxidizing action. An aluminum zeolite may be prepared in the same way and either will give better results than previously used zeolites when the removal of colloids alone at this stage is required.

But this process, like the aeration and manganese zeolite processes, while removing colloids as shown by the disappearance of discoloration caused by iron compounds, left the water hard so that the subsequent treatment for removing hardness had to be maintained. The two actions could not be combined because the two types of zeolites used were very different; the softening zeolite had no power to remove colloids and the colloid removing zeolite had had its softening capacity exhausted so that it could not remove hardness.

The removal of colloids by the ferrous zeolite which I produced is satisfactory of itself but it is desirable to combine the two processes of removing colloids and hardness into one process. In other words it is desirable to produce a zeolite which has both the capacity to remove hardness and the capacity to remove colloids.

Consideration of the fact that two distinctly different processes were involved in the treatment of water—one involving the removal of crystalloids by base exchange, the other the removal of colloids by coagulation—led me to believe that a zeolite could be specially treated to cause it to remove both hardness and colloids simultaneously. I was aware, of course, that natural zeolite such as greensand has originally some capacity for removing colloids as well as for removing hardness; also that some artificial and some improved natural zeolites may have both capacities as an incidental result of the process of their preparation; but in all such cases the capacity for removing colloids is soon exhausted and the regenerating treatment (usually with NaCl) which is given to restore the softening capacity does not restore the capacity for removing colloids. So far as I know, there is no process wherein the same body of zeolite is intentionally used for both actions and no process where the zeolite is regenerated for both actions either intentionally or unintentionally.

The softening or base exchange capacity of the zeolite may be inherent or may be increased by treating it in any of the various ways now known, including my own process as set forth and claimed in my Patent Number 1,804,964 dated May 12, 1931. According to the process disclosed in that patent, zeolite is treated with an acid of phosphorous to indurate it and improve its water softening capacity. I have found that the capacity to remove colloids may be imparted to the same zeolite by treating it with certain coagulents such as sodium aluminate ($Na_2Al_2O_4$), sodium stannate ($Na_2Sn_5O_{11}$), and other similarly acting alkali salts of metallic acids, or other equivalents.

As the body of zeolite becomes exhausted as to either of its dual capacities it is regenerated. If its softening capacity is exhausted it is regenerated with an alkali salt such as salt (NaCl), potash (KCl), ammonium chloride ($NH_3Cl$) or the like; if the capacity to remove colloids is exhausted it is regenerated with one of the coagulents mentioned above, that used being the one found most suitable for the particular colloid to be removed. The attachment of the coagulent to the zeolite particles is apparently not effected by a base exchange action but by adsorption.

The two regenerative treatments may be given in any desired order. Most types of water will exhaust the base exchange softening capacity before the capacity for removing colloids is exhausted but other types of water may be different. For most types of water requiring treatment for colloids the capacity for removing colloids will remain for about four or five softening periods if the zeolite was fully regenerated for both capacities initially. Stated another way, a full regeneration for colloid-removing capacity is needed only after four or five regenerations for softening capacity. If desired, both regenerative treatments may be given together whenever it becomes necessary to give either of them. In any case, the different regenerative treatments are successive (not simultaneous), though as stated they may be immediately successive or periodically successive and in part periodically repeated as to one, or periodically alternated, or in any other desired order whatsoever.

In any given type of water the proportion of dissociable compounds to colloidal compounds will generally be constant, though for different types of water the proportion will vary. If the proportion of colloids is relatively high a deposit on the zeolite grains may gradually accumulate in spite of the regenerative treatment with coagulents for their removal. In such cases it becomes necessary to supplement the regeneration by the usual coagulents (sodium aluminate, etc.) with a separate treatment by either free organic or inorganic acid, acetic or hydrochloric acid being preferable, or by treatment with acid salts such, for example, as sodium bisulphate ($NaHSO_4$), potassium persulphate ($K_2S_2O_8$) or the like, or by the treatment with specific reagents capable of dissolving specific colloidal deposits, such for example as ferric chloride ($FeCl_3$) when the deposit is ferric hydroxide ($Fe(OH)_3$) the object in any case being to dissolve the deposited colloid by an acid which exists in solution.

But the retention on the zeolite of a certain amount of colloidal deposit is desirable for the purpose of indurating or hardening the particles to enable them to withstand purifying and regenerative actions which the zeolite is called upon to undergo. The coagulents prevent the deposition of further colloids unless the water is heavily charged and in this case as noted above a special treatment with acids may be given it to remove some of the deposit though if the colloid-produced induration is desired all of the colloid need not be removed.

I will now give a very specific example to illustrate the principal steps in my process, though it is to be understood that reference made herein to specific compounds or minutiae of procedure are not to be read as limitations upon the invention.

For indurating the zeolite I may treat 100 lbs. of greensand zeolite for a period of 24 hours with a solution of 5 lbs. of colloidal hydroxide of iron in 50 gallons of water or for a shorter period if the water is heated to the boiling point. The indurated or hardened greensand withstands the action of acid better than greensand prepared by the socalled stabilization methods. Any zeolite either natural or artificial, and prepared in any of various known processes, including my own, may be used.

One pound (1 lb.) of this indurated greensand (or not so indurated, it may be) is treated with 35 grains of salt (NaCl) in order to establish its full base exchange capacity. Following this it is treated with a solution of 75 grains of sodium aluminate in 100 ccm. of water. The resulting zeolite is washed.

A test run with this zeolite was then made by passing through it a water containing 11.2 grains Fe in colloidal solution and 22.2 grains of calcium chloride ($CaCl_2$) per gallon. The filtered water was clear and colorless, free from iron and of zero hardness. After the passage of 2 gallons of water the softening capacity of the mineral was exhausted corresponding to 40 grains of calcium carbonate removal per pound of mineral but the capacity for removing colloidal iron had not been exhausted. The precipitate of the colloidal iron separated out in the zeolite bed in the shape of voluminous hydroxide of iron which was removed from time to time as it began to impede the flow of water by backwashing. The water passing through the bed continued to show a hardness equal to 20 grains CaCO₃ per gallon but was entirely free from colloidal iron. The bed was not exhausted for colloidal iron removal until a total of 35.25 grains of iron (equivalent to 94.4 grains calcium carbonate on a base exchange basis) was removed.

The exhausted zeolite regenerated with salt alone was capable of removing hardness by base exchange but the capacity for removing colloidal iron remained exhausted. This was shown by the fact that the water therethrough was soft but yellow with unabsorbed colloidal iron.

The bed was revivified first with a solution of 35 grains of salt in water, followed by a treatment of 75 grains of sodium aluminate in water. The resulting zeolite again possessed the same base exchange capacity as well as the same ability to remove colloidal iron as it had in the beginning.

In the above example if it were desired to equalize the two capacities at each treatment for the water being treated the regeneration would be effected with 35 grains of salt followed by 50 grains of sodium aluminate. If there is a deposit of colloids this may be removed by treatment with a solution containing one of the acids or acid salts mentioned above for this purpose.

If the dual capacity is not required the zeolite may be regenerated for either capacity alone and left exhausted for the other capacity.

The invention thus provides an improved zeolite, a short and effective process of purifying water with zeolites and permits the simplification of the apparatus required.

While one embodiment of the invention has been described in detail in order to furnish a concreate illustration, it is to be understood that the invention is not to be limited except by the prior art and the scope of the subjoined claims.

What I claim is:

1. The method of treating a zeolite to improve it for conjointly removing hardness and colloids from water which comprises, indurating it by subjecting it to the action of a colloid to resist the action of acids and acid salts, treating it with a coagulant to cause the coagulant to be adsorbed thereon to render the bed of zeolite capable of removing colloids from the water, subsequently regenerating the zeolite to restore its softening and colloid-removing capacities as they become diminished or exhausted and treating it with potassium persulphate to remove excess deposits of colloids.

2. The method of treating a zeolite to improve it for conjointly removing hardness and colloids from water which comprises treating it with an acid of phosphorous and an alkali salt of a metallic acid of the group consisting of sodium aluminate and sodium stannate to improve its water softening and colloid-removing capacities respectively and regenerating it from time to time with an alkali salt to restore its softening capacity and with a coagulant to restore its colloid-removing capacity.

3. The method of treating a zeolite to improve it for conjointly removing hardness and colloids from water which comprises indurating it with a colloid.

4. The method of treating a zeolite to improve it for conjointly removing hardness and colloids from water which comprises indurating it with a colloid and subsequently treating it with a solvent to remove excessive collections of colloids.

5. The method of treating a zeolite to improve it for conjointly removing hardness and colloids from water which comprises indurating it with a colloid and subsequently treating it with a coagulant to enable it to remove colloids from water.

6. The method of purifying water to remove hardness and colloids which comprises, subjecting the water to a single combined treatment with a zeolite to remove both hardness and colloids and subsequently regenerating the zeolite to reestablish both its softening and colloid-removing capacities.

7. The method of purifying water which comprises treating it with a zeolite having adsorbed thereon a coagulant capable of removing colloids and regenerating the zeolite from time to time to replace the coagulant thereon.

8. The method of purifying water which comprises treating it with a zeolite having a coagulating capacity for removing colloids and regenerating the zeolite after use to restore the coagulating capacity thereto.

9. The method of purifying water which comprises treating it to remove colloids with a ferrous zeolite formed from a softening zeolite by base exchange with ferrous sulphate.

10. As an article of manufacture a zeolite having base exchange capacity, the zeolite being indurated with a colloid and also carrying an adsorbed coagulant thereon capable of removing colloids from the water.

11. The method of treating a zeolite to maintain its water softening and colloid-removing capacities which comprises treating it with an alkali salt and a coagulant at intervals.

FREDERICK TSCHIRNER.